United States Patent [19]

Sinha et al.

[11] Patent Number: 4,751,944

[45] Date of Patent: Jun. 21, 1988

[54] DUPLEX MECHANICAL TUBE PLUG

[75] Inventors: Susanta Sinha; Robert F. Keating; Lawrence A. Nelson, all of Penn Township, Westmoreland County, Pa.

[73] Assignee: Westinghouse Electric Corp., Pittsburgh, Pa.

[21] Appl. No.: 868,226

[22] Filed: May 28, 1986

[51] Int. Cl.⁴ ............................................. F16L 55/12
[52] U.S. Cl. ...................................... 138/89; 220/234; 165/71
[58] Field of Search ............... 138/89, 96 R; 29/523; 220/234, 237; 165/71

[56] References Cited

U.S. PATENT DOCUMENTS

| 1,470,767 | 10/1923 | Schaper . | |
|---|---|---|---|
| 2,238,643 | 4/1941 | Hicks | 220/237 X |
| 3,287,920 | 11/1966 | Oitto | 138/89 X |
| 3,590,877 | 7/1971 | Leopold et al. | 138/89 |
| 4,091,841 | 5/1978 | Beneker et al. | 138/89 |
| 4,114,654 | 9/1978 | Richardson | 138/89 |
| 4,262,187 | 4/1981 | Savor | 138/89 X |
| 4,347,790 | 9/1982 | Lizen | 138/89 X |
| 4,366,617 | 1/1983 | Nanstiel et al. . | |
| 4,390,042 | 6/1983 | Kucherer | 138/89 |
| 4,393,564 | 7/1983 | Martin | 138/89 X |
| 4,425,943 | 1/1984 | Martin | 138/89 |
| 4,436,117 | 3/1984 | Martin | 138/89 |
| 4,458,721 | 7/1984 | Yie et al. | 138/89 X |
| 4,502,511 | 3/1985 | Zafred | 138/89 |

FOREIGN PATENT DOCUMENTS

WO85/04701 10/1985 World Int. Prop. O. ............ 138/89
21164 of 1909 United Kingdom .

Primary Examiner—James E. Bryant, III
Attorney, Agent, or Firm—D. M. Satina

[57] ABSTRACT

The tube plug comprises a substantially cylindrical sheath closed at one end and having a relatively smooth outer surface and a central cavity. An expandable shell is received within the central cavity of the sheath. An expander member is adapted to expand the shell from within by being axially translated within the shell, the expander member also being adapted to grip the inner surface of the shell to retain the expander member in the expanded position. The outside surface of the shell is preferably provided with a plurality of lands. A second embodiment of the tube plug comprises a sleeve, a closed shell member adapted to be inserted within the sleeve, and an expander member contained within the shell. Upon axial translation of the expander member within the shell, the shell is expanded into contact with the sleeve and the sleeve is expanded into contact with the tube, thereby sealing the tube.

22 Claims, 2 Drawing Sheets

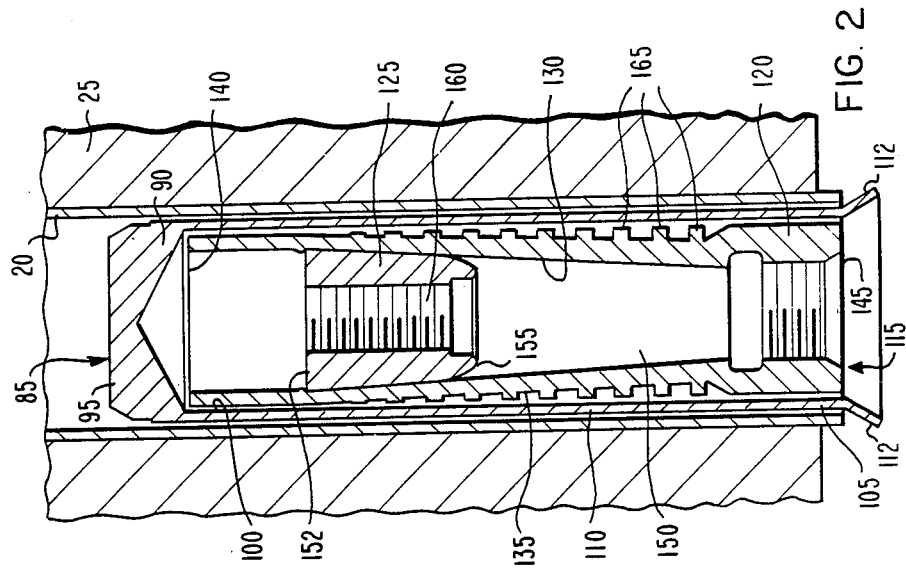
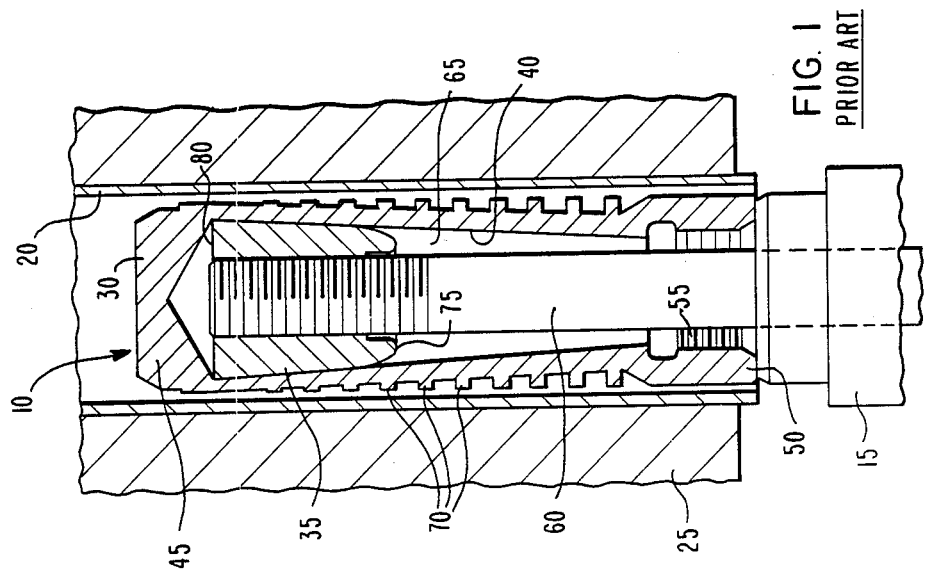
FIG. 1 PRIOR ART
FIG. 2

DUPLEX MECHANICAL TUBE PLUG

CROSS-REFERENCE TO RELATED APPLICATIONS

This invention is related to copending U.S. patent application Ser. No. 886,225 filed May 28, 1986 in the name of Ermold et al. and entitled "Multi-Seal Mechanical Tube Plug".

BACKGROUND OF THE INVENTION

Field of the Invention

This invention relates to tube plugs and more particularly to apparatus for plugging heat exchanger tubes.

In tube-type heat exchangers, a first fluid flows through the tubes of the heat exchanger while a second fluid surrounds the outside of the tubes such that heat exchange occurs between the two fluids. Degradation of some of the tubes may occur such that a leak either is impending or occurs therein which allows the two fluids to mingle. When this occurs it is sometimes necessary to plug the tubes so that the fluid does not flow through the tubes, thereby preventing leakage from the tubes.

In nuclear reactor power plants, the tube-type heat exchangers are commonly referred to as steam generators. If degradation occurs in the tubes of a nuclear steam generator to such an extent that the coolant in the tubes is allowed to mingle with the coolant outside of the tubes, a more significant problem arises. Since the fluid flowing in the tubes of a nuclear steam generator is generally radioactive, it is important that it not be allowed to leak from the tubes and contaminate the surrounding fluid. Therefore, when degradation beyond the permissible limit occurs in a nuclear steam generator heat exchanger tube, the tube is plugged so that the coolant is not permitted to flow through the tube. This prevents potential contamination of the fluid surrounding the tubes.

There are several kinds of plugs that may be used to plug the heat exchanger tubes. One such device used to plug heat exchanger tubes in nuclear steam generators is an explosive plugging device. With the explosive plugging devices, a metal plug containing an explosive charge is inserted into the heat exchanger tube. When the explosive is detonated, the plug is forced into close contact with the inside of the tube, thus blocking fluid flow through the tube. One problem associated with explosive plugging is that should it become necessary to remove the defective tube or the plug, the plug must be removed by time-consuming machining methods, which result in undesirable radioactive exposure and high cost.

There are also several kinds of plugs that can be used to plug heat exchanger tubes which do not use explosives. One such tube plug is described in U.S. Pat. No. 4,502,511 issued Mar. 5, 1985 in the name of Zafred, assigned to the Westinghouse Electric Corporation, and entitled "Tube Plug". The substantially cylindrical shell of this tube plug is expanded into contact with the inside surface of the tube, preferably by a conventional roller expander. The expander is then removed.

Other mechanical plugs are useful for plugging the heat exchanger tubes of nuclear steam generators. One such mechanical plug is described in U.S. Pat. No. 4,390,042 issued June 28, 1983 in the name of Kucherer et al., assigned to the Westinghouse Electric Corporation, and entitled "Tube Plug". The shell of this plug has a tapered inner surface against which an externally tapered expander member moves by the application of a pulling force and the motion of the expander member relative to the shell causes the shell to expand into contact with the tube. The expander has a self-locking trailing edge to prevent inadvertent unlocking of the plug. A plurality of lands, which are formed on the outside of the shell, are impressed in the wall of the heat exchange tube, causing the plug to be locked, thereby establishing a type of labyrinth seal along the inner surface of the heat exchanger tube.

Installation of this type of mechanical plug may be accomplished using a plug installation apparatus such as the apparatus described in U.S. Pat. No. 4,369,662 issued Jan. 25, 1983 in the name of Rieben et al., assigned to the Westinghouse Electric Corporation, and entitled "Plug Installation Apparatus". A rod or drawbar of this apparatus captures the expander member of the plug and a force, preferably provided hydraulically, urges the drawbar downward, axially moving the expander member with respect to the shell and causing the shell to expand into contact with the inner surface of the heat exchange tube. The installation apparatus is then removed, leaving the plug within the tube.

If removal of this type is required, the preferred removal apparatus is described in U.S. Pat. No. 4,366,617 issued Jan. 4, 1983 in the name of Nansteil et al., assigned to the Westinghouse Electric Corporation and entitled "Plug Removal Apparatus". A rod holds the shell of the plug while a ram pushes the expander member relative to the plug to relieve the pressure on the plug. An activating cylinder can then be used to extract the plug from the tube by pulling.

Pushing the expander into the larger portion of the plug may not loosen the plug from tight contact with the internal surface of the tube. Subsequent plug removal by pulling may result in marking of the tube wall. What is needed is a new mechanical tube plug that is capable of being quickly and easily installed in a heat exchange tube and which can be easily removed therefrom while causing a minimum amount of marking of the tube wall.

SUMMARY OF THE INVENTION

The invention is a tube plug for preventing fluid flow through heat exchanger tubes. The tube plug has a substantially cylindrical sheath with one closed end, a cylindrical section, and an open end. The sheath has an inner surface which defines a central cavity. The open end of the sheath is in fluid communication with the cavity. The sheath has a relatively smooth outer surface. The tube plug also includes a substantially cylindrical expandable shell adapted to be received within the cavity of the sheath, the expandable cylindrical shell having an inner surface and an outer surface. The plug also includes an expander member having an outer surface. The expander member is adapted to be received within the expandable shell and to expand the expandable shell to urge the outer surface of the expandable shell into contact with the inner surface of the sheath for expansion of a portion of the cylindrical section of the sheath into contact with the inside of the tube. The expander member is adapted to expand the expandable shell by being axially translated within the shell to an expanded position and the outer surface of the expander member is adapted to grip the inner surface of the shell to retain the expander member in the expanded position.

Disposed about the outside surface of the shell are a plurality of lands for contacting the sheath when the shell is expanded by axial translation of the expander member, expansion of the shell acting to urge a portion of the sheath into contact with the inside of the tube.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

FIG. 1 is a cross-sectional view in elevation of a prior art tube plug positioned within a heat exchanger tube to be plugged and attached to a plug installation apparatus;

FIG. 2 is a cross-sectional view in elevation of the preferred embodiment of the duplex mechanical tube plug and the heat exchanger tube;

DESCRIPTION OF THE PREFERRED EMBODIMENT

Figure 4:
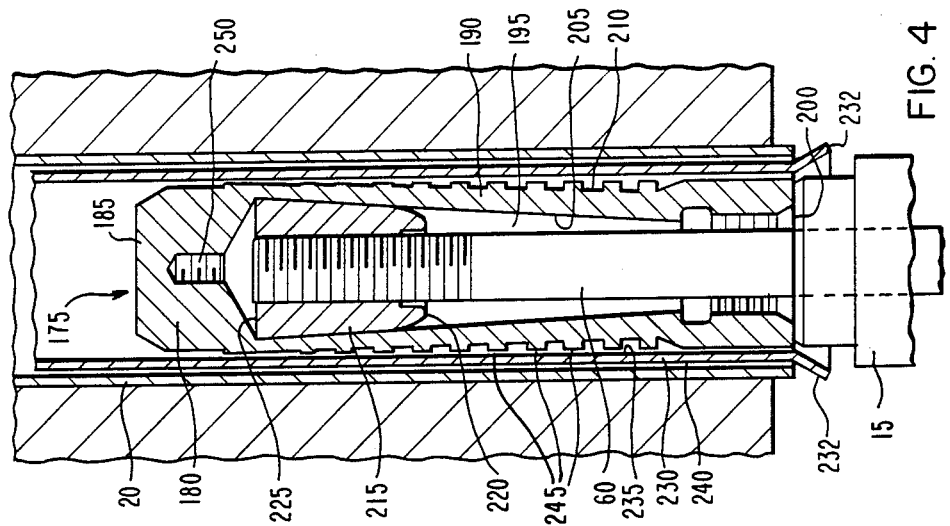
FIG. 4 is a cross-sectional view in elevation of an alternative embodiment of the duplex mechanical tube plug as positioned within a heat exchanger tube and attached to a tube plug installation apparatus.

Due to the degradations that sometimes occur in heat exchanger tubes, it is occasionally necessary to plug the heat exchanger tubes. The invention described herein provides a mechanical tube plug for effectively plugging a tube in the heat exchanger and thus preventing circulation of a fluid through the heat exchanger tube.

Referring to FIG. 1, there is shown a prior art tube plug 10 for plugging heat exchange tubes as described in U.S. Pat. No. 4,390,042 issued June 28, 1983 in the name of Kucherer et al., assigned to the Westinghouse Electric Corporation, and entitled "Tube Plug". This tube plug 10 is shown attached to tube plug installation apparatus 15 positioned within tube 20 near the bottom of tube-sheet 25. Tube plug 10 comprises a shell 30 and an expander member 35. Shell 30 may be a substantially cylindrical member manufactured from a corrosion resistant metal such as Inconel. Shell 30 has a conical inner surface 40 which has a larger diameter at the closed end 45 and a smaller diameter at the open end 50. Inner surface 40 is arranged such that expander member 35 is captured within shell 30 so that movement of expander member 35 relative to inner surface 40 causes shell 30 to expand without allowing expander member 35 to be removed from shell 30. Shell 30 also has a threaded bore 55 near open end 50 which allows the drawbar 60 of installation apparatus 15 to be inserted through threaded bore 55 and into the interior 65 of shell 30. Shell 30 preferably has a substantially uniform wall thickness in the portion of shell 30 that is expanded by expander member 35. In addition, a plurality of lands 70 are formed on the outside surface of shell 30 in a manner such that the height of each land 70 increases from closed end 45 to open end 50 while the outer surfaces of all lands 70 are maintained at approximately the same external diameter and while the wall thickness of shell 30 preferably remains substantially constant throughout the portion of shell 30 where lands 70 are located. Expander member 35 may be manufactured from a hardenable metal, such as stainless steel alloy Carpenter 455, and is preferably machined such that it has a leading edge 75 which has a tangentially blended radius that minimizes plowing or pushing metal ahead of expander member 35 when expander member 35 is pulled through shell 30 by drawbar 60 of plug installation apparatus 15. Expander member 35 also has a trailing edge 80 which is formed to have a sharp edge such that it provides a self-locking mechanism to restrain expander member 35 from moving toward closed end 45 of shell 30, thereby preventing loosening of plug 10 within tube 20.

Referring now to FIG. 2, there is shown the preferred embodiment of the duplex mechanical plug 85 as positioned within a heat exchange tube 20 near the bottom of tubesheet 25. Tube plug 85 comprises a substantially cylindrical sheath 90 having a closed end 95, a central cavity 100, and an open end 105 in communication with cavity 100. The sheath has a cylindrical section 110 which is attached to the closed end 95. Sheath 90 may be machined from a piece of bar stock material so that cylindrical section 110 is integral with end 95. Alternatively, cylindrical section 110 may be a tubular member which is welded to end 95 by conventional means. In either case, the outer surface of cylindrical section 110 is preferably smooth with the preferred surface roughness being that of a machined surface, which corresponds to about 32 RMS or 35 AA. A smoother surface would not be detrimental but would be more expensive. Sheath 90 is preferably made from a corrosion-resistant material such as Inconel. Sheath 90 is preferably provided with a flange 112 at open end 105 to prevent over insertion of the plug within the tube and to act as a ledge for gripping the sheath should subsequent removal be necessary.

Disposed within central cavity 110 of the preferred embodiment of FIG. 2 is an expander 115. Expander 115 preferably comprises a substantially cylindrical shell 120 with a substantially conical expander member 125 disposed therein. Shell 120 has an inside surface 130 and an outside surface 135. Shell 120 also has an opening 140 in the end nearest the closed end of sheath 90 and an opening 145 in the end nearest the open end 105 of sheath 90, opening 145 being in communication with a hollow central portion 150 of shell 120. The inside surface 130 of shell 120 is preferably conical with the hollow central portion 150 having a larger inside diameter near the end of shell 120 adjacent the closed end 95 of sheath 90 and having a smaller inside diameter near the end of shell 120 proximate the open end 105 of sheath 90.

Conical expander member 125 has a tapering outer surface which extends from a larger diameter end 152 to a smaller diameter end 155. Expander member 125 of slidably disposed in the hollow central portion 150 of shell 120 with the larger diameter end 152 being nearer the closed end 95 of sheath 90 and the smaller diameter end 155 being nearer the open end 105 of sheath 90. The conical outer surface of expander member 125 cooperates with the conical inner surface 130 of shell 120 to expand shell 120 into contact with sheath 90 when expander member 125 is slid axially toward the open end 105 of sheath 90. The expanding outer surface 135 of expander shell 120 contacts the inner surface of the cylindrical section 110 of sheath 90 and expands the cylindrical section to urge a portion of the outer surface of the cylindrical section into contact with the tube. During this expansion process, sheath 90 is preferably plastically deformed. While fluid can pass through opening 145, which may be internally threaded to accommodate the plug removal and installation apparatus previously described, through hollow central portion 150 and through a threaded central hole 160 in expander member 125 into cavity 100, fluid cannot gain access to the interior of tube 20 since end section 95 and cylindrical section 110 of sheath 90 serve to block fluid flow. Expander shell 120 is preferably made from a corrosion-resistant material such as Inconel which has been hardened to enable the shell to transmit force to sheath 90. Expander member 125 is preferably made from a hardenable metal such as stainless steel alloy Carpenter 455.

The outer surface 135 of expander shell 120 is preferably provided with a plurality of lands 165 at predetermined locations along the section of shell 120 which will be expanded by movement of exander member 125. When expander member 125 is moved toward the open end 105 of sheath 90 by drawbar 60 shown in FIG. 1, which threads into hole 160, shell 120 is expanded and lands 165 initially contact the inner surface of sheath 90. Continued movement of expander member 125 further expands shell 120 causing lands 165 to expand sheath 90 to force the outer surface of sheath 90 into contact with tube 20. The lands 165 act to concentrate the force transmitted by the interaction between the conical inner surface 130 of shell 120 and the conical outer surface of expander member 125 during axial translation of expander member 125 within shell 120. The lands appear as rings on the outside surface 135 of shell 120 and are rigid enough to transmit sufficient force radially to a portion of cylindrical section 110 of shell 120 to urge the outside surface of the portions of cylindrical section 110 corresponding to the portions of the inside of cylindrical section 110 contacted by lands 165 into contact with tube 20. By sealing the sheath 90 to the tube 20, a leak-tight plug is established.

Figure 3:
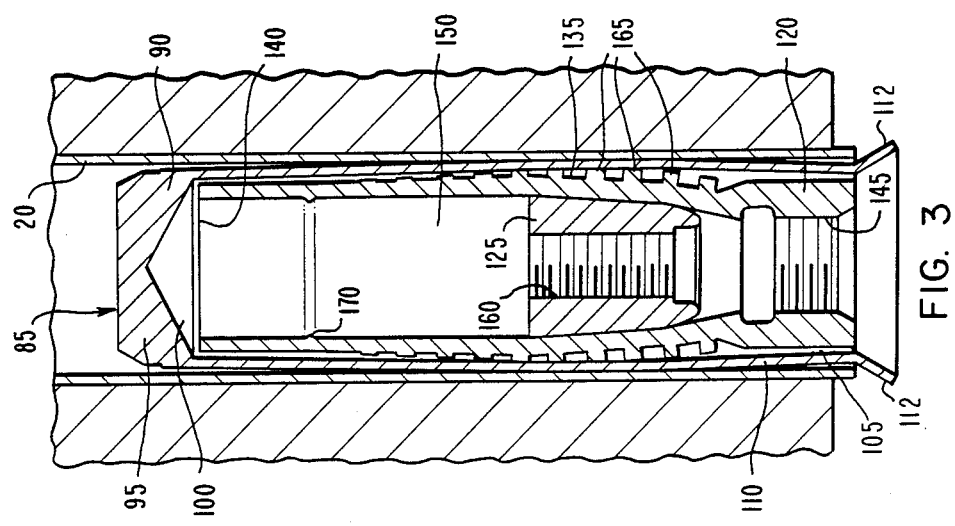
FIG. 3 is a cross-sectional view in elevation of the duplex mechanical tube plug in the expanded condition within a heat exchanger tube.

FIG. 3 depicts the plug 85 in the expanded condition within tube 20. It is clear from FIG. 3 that fluid cannot pass between sheath 90 and tube 20 once expander member 125 has been moved toward open end 105 of sheath 90, thereby forcing lands 165 on the outside surface 135 of shell 120 into contact with portions of cylindrical section 110 of sheath 90 and the portions of cylindrical section 110 contacted by lands 165 have been urged against tube 20. While fluid can enter cavity 150 within expander shell 120 through threaded hole 145 in shell 120 and through threaded hole 160 in expander member 125, it is prevented from passing into the interior of tube 20 by end section 95 and its attachment to cylindrical section 110 of sheath 90. Expander shell 120 is manufactured with an open end 140 primarily for ease of manufacture. This open ended construction also acts to alleviate potential problems associated with leakage between sheath 90 and expander shell 120. In the unlikely event that fluid was able to pass about the exterior surface 135 of shell 120 and into cavity 100 of sheath 90, the high temperatures associated with the generation of steam in a power plant could cause this fluid to expand. If expander shell 120 was manufactured with a closed end, this fluid expansion could exert detrimental forces within cavity 100 between the sheath 90 and the shell 120.

The expander shell 120 depicted in FIGS. 2 and 3 is simpler to manufacture than the shell 30 of plug 10 of FIG. 1 since expander member 125 can be inserted within expander shell 120 through opening 140 and only minimal forming is required to form protrusions 170 to retain expander member 125 within shell 120.

Expander member 125 is self-locking within shell 120 into the expanded position depicted in FIG. 3. The conical inner surface 130 of shell 120 is inclined at a half-angle of approximately 3° and the conical outer surface of expander member 125 is provided with an angle slightly greater than the 3° half-angle of inclination of conical surface 130. This difference in the inclination of surface 130 and the outer surface of expander member 125 acts to increase friction between these surfaces when expander member 125 is pulled toward the open end 105 of sheath 90. The increased friction aids in restraining expander member 125 in the expanded position. Also, the larger or trailing edge 150 of expander member 125 is manufactured with a sharp edge to aid in gripping the inner surface 130 of shell 120 after expander member 125 has been axially translated toward the open end 105 of sheath 90 by drawbar 60. Drawbar 60 can then be removed and the expander member 125 will remain in position within shell 120 as shown in FIG. 3. The cooperation of the differing angles of inclination of the interior surface 130 of shell 120 and the exterior surface of expander member 125 along with the sharp trailing edge 150 act to firmly restrain expander member 125 within shell 120 against inadvertent dislodging. Protrusions 170 are provided as ledges against which edge 150 of expander member 125 can be urged to create sufficient friction to thread in drawbar 60 for expansion of shell 120. The drawbar can easily be unthreaded after the expander member has been moved within shell 120 to the position depicted in FIG. 3 since it is prevented from rotating by friction.

For removal of the plug depicted in FIGS. 2 and 3, the drawbar 60 is again threaded into the threaded hole 160 of expander member 125 and the balance of the plug removal tool (not shown) is threaded into hole 145. A mechanism, preferably a hydraulic ram, forces drawbar axially upward towards the closed end 95 of sheath 90, thereby forcing expander member 125 upwardly. The force provided is preferably sufficient to overcome the resistance offered by protrusions 170 and to axially translate expander member 125 to hole 140 in the end of shell 120 nearest to the closed end 95 of sheath 90. The shell 120, which will generally not spring back sufficiently for removal by pulling, can be loosed by TIG relaxation, wherein a small electrode is passed axially or helically along the inner surface of the shell to contract the shell. Alternatively, some other diametrical contraction method may be employed to loosen shell 120 for removal. When shell 120 and expander member 125 have been removed, sheath 90 may be removed by pulling or by contraction first with the TIG or other method and then by pulling. Sheath 90 is preferably gripped for removal by flange 112. However, sheath 90 may be provided with internal threads for gripping near open end 105 and/or with a threaded hole in closed end 95, such as hole 250 shown in the alternate embodiment of FIG. 4. In either case, the walls of tube 20 should exhibit no detrimental effects from having been plugged.

The plug 85 depicted in FIGS. 2 and 3 can be used to plug a tube or can be used to plug a sleeve disposed within the tube and extending to the bottom of the tubesheet. In either event, the plug works best on an orifice having a diameter near the outer diameter of the cylindrical section 110 of sheath 90 in its unexpanded condition for plugging ⅞ inch diameter heat exchanger tubes, plug 85 works well within tubes having a diameter of up to about 0.06 inches greater than the diameter of the cylindrical section 110. Sheath 90 of plug 85 is required to expand very little within a tube having a diameter very close to the outer diameter of cylindrical section 110. Therefore, in tubes of this size, expander member 125 will be axially translated only a limited distance. However, as the tube diameter increases with respect to the outer diameter of cylindrical section 110, the expander member will have to be drawn axially farther toward the open end 105 of sheath 90 in order to expand shell 120 sufficiently to urge lands 165 with great enough force to expand cylindrical section 110 of sheath 90 into contact with tube 20. Therefore, for different size tube diameters, different ones of the lands 165 may be transmitting force through the sheath to create the seal between the sheath and the tube. However, for plugging steam generator tubes with plug 85, the outer surface 135 through lands 165 preferably contacts sheath 90 along about 0.200 inches along an axial line through the tube plug 85. Lesser or greater contact between tube 20 and plug 85 could be used to create a leak tight seal.

The force necessary to expand the shell and sheath into contact with tube 20 is dependent upon several factors. The greatest variation derives from plugging tubes of different diameters. For example, a $\frac{5}{8}$" diameter tube or sleeve within a tube would require a relatively small plug with an installation force on the order of 5,000 to 7,000 pounds, whereas installation of a plug in a larger tube such as a $\frac{7}{8}$" diameter tube, would require an installation force of up to 17,000 or 19,000 pounds.

Since the sheath 90 acts as the plug for tube 20 and constitutes the primary leak path, the walls of cylindrical section 110 must be manufactured to a minimum thickness to withstand the corrosive environment and pressures associated with operation of a steam generator. The preferred thickness of cylindrical section 110 is 0.035 to 0.040 inches. Also, closed end 95 may be manufactured with a threaded hole (not shown) as described above which would extend partially through end 95 from cavity 100 to an enable gripping of end cap 95 for removal purposes.

FIG. 4 depicts an alternate embodiment 175 of the duplex mechanical tube plug. Tube plug 175 comprises a substantially cylindrical shell 180 having a closed end 185, a substantially cylindrical section 190, a substantially conical central hollow cavity 195 and an open end 200 in communication with cavity 195. The cavity 195 is smaller in diameter near the open end 200 of shell 180 and is of a larger diameter near the closed end 185. Cylindrical section 190 has a conical inner surface 205 and an outer surface 210. Plug 175 further comprises an expander member 215 having a substantially conical outer surface extending from a smaller end 220 to a larger end 225. The expander member 215 is slidably disposed within cavity 195 with the smaller end 220 being arranged nearer the open end 200 of shell 180 and the larger end 225 being arranged near the closed end 185. The conical outer surface of expander member 215 cooperates with the conical inner surface 205 of shell 180 to expand a portion of cylindrical section 190 when expander 215 is moved toward open end 200 of shell 180 such as by a drawbar 60 of a plug installation apparatus 15.

Plug 185 further comprises a sleeve 230 disposed between tube 20 and expander shell 180. Sleeve 230 is preferably provided with a flange 232 to prevent over insertion of plug 175 within tube 20 and to assist in gripping the sleeve should subsequent plug removal prove necessary. Shell 180 is received within sleeve 230 and the two are positioned within tube 20 to be plugged. When expander member 215 is drawn toward open end 200 of expander shell 180, cylindrical section 190 of expander shell 180 is expanded into contact with the inner surface 235 of sleeve 230, causing sleeve 230 to expand and forcing the outer surface 240 of sleeve 230 into contact with tube 20, creating a seal through the interaction of shell 180, sleeve 230, and plug 20. As with the plug 85 of FIGS. 2 and 3, lands 245 are preferably provided about the outer surface 210 of expander shell 180 to concentrate the expansion force at certain portions of the inner surface 235 of sleeve 230 to expand sleeve 230 at these portions to urge the outer surface 240 of sleeve 230 into contact with tube 20 at these locations. Inner surface 205 of expander shell 180 is preferably inclined at an angle of about 3° and the outer surface of expander member 215 is preferably inclined at a slightly greater angle such that the expander member is firmly gripped by the conical inner walls 205 of expander shell 180 after it has been moved toward the open end 200 of expander member 180. The sharp trailing edge 225 of expander member 215 also assists in restraining expander member after plug expansion.

Sleeve 230 and expander shell 180 are preferably manufactured from a corrosion resistant material such as Inconel while expander member 215 is preferably manufactured from a hardenable metal such as stainless steel alloy Carpenter 455. Since sleeve 230 of plug 175 acts primarily to cushion the tube 20 from the concentrated expansion force transmitted through lands 245, sleeve 230 can be substantially thinner than cylindrical section 110 of plug 85 depicted in FIGS. 2 and 3. Expander shell 180 may be provided with a threaded removal hole 250 to assist in plug removal. A threaded hole, such as threaded hole 250, may be employed on closed end 95 of sheath 90 of plug 85 as previously described.

Plug 85 is preferred over plug 175 primarily because there are two potential leak paths inherent in this plug design. The first potential leak path is between tube 20 and sleeve 230. The second potential leak path is between sleeve 230 and expander shell 180 about outer surface 210 and lands 245. In contrast, plug 85 has only one potential leak path between the tube 20 and the outer surface 135 including lands 165 of cylindrical section 110 of sheath 90.

For removal of plug 175, a rod is threaded into threaded hole 255 in expander member 215 and a plug removal apparatus is threaded into threaded opening 200. An axial force is transmitted to expander member such as by a hydraulic ram and expander member 215 is forced toward the closed end 185 of expander shell 180. Expander shell 180 may then be loose enough to be pulled from within sleeve 230. If not, TIG relaxation or another diametrical contraction method can be used to contract shell 180 and enable removal of shell 180 from within sleeve 230. Sleeve 230 can then be withdrawn by pulling. Gripping of sleeve 230 is preferably by flange 232 but sleeve 230 may be provided with interior threads (not shown) near flange 232 for this purpose.

Therefore, it can be seen that the invention provides a duplex mechanical tube plug capable of being quickly and easily installed in the heat exchange tube of a nuclear steam generator that is leak-tight, easily removable, and precludes any damage to the inner walls of the tube should subsequent removal be necessary.

We claim as our invention:

1. A tube plug for preventing flow through a heat exchange tube, said tube plug comprising:

substantially cylindrical sheath means for blocking flow through the tube, said sheath means having one closed end, a cylindrical section, and an open end, said sheath means also having an inner surface defining a central cavity within said sheath means, the open end of said sheath means being in fluid communication with the cavity, said sheath means also having a relatively smooth outer surface;

a substantially cylindrical expandable shell within the cavity of said sheath means, said expandable shell having an inner surface and an outer surface, the outer surface being provided with a plurality of circumferential lands; and an expander member having an outer surface, said expander member being within said expandable shell and being adapted to expand at least a portion of said expandable shell to urge at least one of the lands provided on the outer surface of said expandable shell into contact with the inner surface of said sheath means, the at least one land in contact with the inner surface concentrating force from expansion of the shell onto circumferential portions of said sheath means for expansion of at least a portion of the relatively smooth outer surface of the cylindrical section of said sheath means into contact with the inside of the tube to create a seal between the inside of the tube and said sheath means without damage to the inside of the tube, said expander member continuously urging the shell into contact with said sheath means to maintain contact between said sheath means and the inside of the tube for perpetuating the seal between the inside of the tube and said sheath means.

2. The tube plug according to claim 1, wherein said expander member is adapted to expand said expandable shell by being axially translated within said shell to an expanded position and the outer surface of said expander member is adapted to grip the inner surface of said shell means to retain said expander member in the expanded position.

3. The tube plug according to claim 2, wherein said expandable shell is provided with a central cavity and an opening in each end, both of the openings being in communication with the cavity.

4. The tube plug according to claim 3, wherein the inner surface of said expandable shell is conical and the cavity within said shell has a larger diameter near the closed end of said sheath means and a smaller diameter near the open end of said sheath means.

5. The tube plug according to claim 4, wherein the outer surface of said expander member is conical and the conical outer surface of said expander member cooperates with the conical inner surface of said shell to expand said shell and said sheath means when said expander member is axially translated toward the open end of said sheath means.

6. The tube plug according to claim 5, wherein the conical inner surface of said expandable shell tapers at a first predetermined rate and the conical outer surface of said expander member tapers at a second predetermined rate, the second predetermined rate being different than the first predetermined rate, the difference between the first predetermined rate and the second predetermined rate acting to increase friction between the inner surface of said shell and the outer surface of said expander member when said expander member is axially translated to the expanded position, the increased friction acting to restrain said expander member from moving out of the expanded position.

7. The tube plug according to claim 6, wherein said conical expander member has a large diameter end and a small diameter end, the large diameter end having a sharp edge to engage the inner surface of said shell means when the expander member is axially translated to the expanded position, the engagement of said expander member with the inner surface of said shell acting to restrain said expander member from moving out of the expanded position.

8. The tube plug according to claim 7, wherein the cylindrical section of said sheath means has a substantially uniform wall thickness.

9. The tube plug according to claim 8, wherein said sheath means and said shell are made of a corrosion resistant metal.

10. A tube plug for preventing flow through a heat exchange tube, said tube plug comprising:

substantially cylindrical shell having one closed end, a substantially cylindrical section, a substantially conical central hollow cavity, and one open end in communication with the cavity, the cavity being of a smaller diameter near the open end of said shell and being of a larger diameter near the closed end of said shell, the cylindrical section having an outer surface;

an expander member having a substantially conical outer surface extending from a smaller end to a larger end and being slidably disposed within the cavity with the smaller end being arranged nearer the open end of said shell means and with the larger end being arranged nearer the closed end for cooperating with the conical cavity to expand said shell when the expander member is axially translated towards the open end of said shell; and substantially cylindrical sleeve means having an opening in each end and adapted to be inserted into the tube to be plugged for receiving said shell with said expander member disposed therewithin and for separating the outer surface of said shell from the inside of the tube, said sleeve means having an inner surface and an outer surface, said shell being disposed within said sleeve means, the axial translation of said expander member within said shell toward the open end of said shell acting to expand at least a portion of the outer surface of the cylindrical section of said shell into contact with the inner surface of said sleeve means with continuing axial translation of said expander member acting to expand at least a portion of said sleeve means and to urge the outer surface of said sleeve means into contact with the inside of the tube, thereby sealing the tube without damage to the inside of the tube, said expander member locking within said shell to perpetuate sealing of the tube.

11. The tube plug according to claim 10, wherein a plurality of lands are disposed on the outer surface of said shell.

12. The tube plug according to claim 11, wherein the lands are provided at predetermined locations selected so that expansion of said shell by axial translation of said expander member toward the open end of said shell acts to expand the lands disposed on the outer surface of said shell into contact with portions of the inner surface of said sleeve means and continued axial translation of said expander member towards the open end of said shell acts to urge a portion of the outer surface of said sleeve means into contact with the inside of the tube.

13. The tube plug according to claim 12, wherein said sleeve means has a substantially uniform wall thickness.

14. The tube plug according to claim 13, wherein the conical central hollow cavity of said shell tapers at a first predetermined rate and the conical outer surface of said expander member tapers at a second predetermined rate, the second predetermined rate being different than the first predetermined rate, the difference between the first and second predetermined rates acting to increase friction between the outer surface of said expander member and the conical cavity when said expander member is axially translated towards the open end of said shell the increased friction acting to restrain said expander member from axial translation towards the closed end of said shell.

15. The tube plug according to claim 14, wherein the larger end of said expander member is provided with a sharp edge adapted to engage the conical cavity of said shell when said expander member is axially translated towards the open end of said shell to restrain said expander member from axial translation towards the closed end of said shell.

16. The tube plug according to claim 15, wherein said shell and said sleeve means are made of a corrosion resistant metal.

17. A tube plug for preventing flow through a heat exchange tube, said tube plug comprising:
 a substantially cylindrical sheath means for blocking flow through the tube, said sheath means having one closed end, a central cavity, and an open end in communication with the cavity, said sheath means having a cylindrical section, the cylindrical section having an inner surface and an outer surface, the outer surface being relatively smooth, and
 an expander means disposed within the central cavity for expanding at least a portion of said sheath means into contact with the inside of the tube, said expander means comprising a substantially cylindrical shell and a substantially conical expander member,
 the cylindrical shell having an inner surface, an outer surface, a hollow central portion, and an opening in each end in communication with the hollow central portion, the inner surface of the shell being conical with the hollow central portion having a larger inside diameter near the end adjacent the closed end of said sheath means and having a smaller inside diameter near the open end of said sheath means,
 the conical expander member having a tapering outer surface extending from a large diameter end to a smaller diameter end and being slidably disposed in the hollow central portion of said shell with the larger diameter end near the closed end of said sheath means and the smaller diameter end near the open end of said sheath means, the expander member being adapted to expand the shell when the expander member is axially translated towards the open end of said sheath means, the shell being adapted to contact the inner surface of a portion of the cylindrical section of said sheath means and to expand the portion of the cylindrical section to urge a portion of the outer surface of the cylindrical section into contact with the inside of the tube, thereby establishing a seal between the tube and said sheath means, the expander member continuously urging the shell means against the portion of the cylindrical section to maintain contact between the cylindrical section and the inside of the tube for perpetuating the seal between the tube and said sheath means.

18. The tube plug according to claim 17, further comprising a plurality of lands disposed about the outer surface of the cylindrical shell of said expander means at predetermined locations selected so that some of said lands are urged into contact with portions of the inner surface of the cylindrical section of said sheath means when the shell is expanded by movement of the expander member, a portion of the outer surface of the cylindrical section of said sheath means being expanded into contact with the inside of the tube upon further movement of the expander member, the expansion of the shell into contact with the inside of the tube acting to prevent fluid flow through the tube.

19. The tube plug according to claim 18, wherein the cylindrical section of said sheath means has a substantially uniform wall thickness.

20. The tube plug according to claim 19, wherein the conical inside surface of the shell tapers at a first predetermined rate and the conical outer surface of the expander member tapers at a second predetermined rate, the second predetermined rate being greater than the first predetermined rate, the difference between the first and second predetermined rates of tapering acting to increase the friction between the outer surface of the expander member and the inner surface of the shell when the expander member is axially translated towards the open end of said sheath means, the increased friction acting to restrain the expander member from being axially translated toward the closed end of said sheath means.

21. The tube plug according to claim 20, wherein the large diameter end of the expander member is provided with a sharp edge, the sharp edge being adapted to engage the conical inner surface of the shell when the expander member is axially translated toward the open end of said sheath means, the engagement acting to restrain the expander member from being axially translated toward the closed end of said sheath means.

22. The tube plug according to claim 21, wherein said sheath means and the shell are made of a corrosion resistant metal.

* * * * *